United States Patent
Hwang et al.

(10) Patent No.: US 8,268,486 B2
(45) Date of Patent: *Sep. 18, 2012

(54) POSITIVE ELECTRODE FOR RECHARGEABLE LITHIUM BATTERY AND RECHARGEABLE LITHIUM BATTERY INCLUDING SAME

(75) Inventors: Duck-Chul Hwang, Yongin-si (KR); Yong-Chul Park, Yongin-si (KR); Jeom-Soo Kim, Yongin-si (KR); Jae-Yul Ryu, Yongin-si (KR); Jong-Hwa Lee, Yongin-si (KR); Euy-Young Jung, Yongin-si (KR); So-Hyun Hur, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/840,162

(22) Filed: Aug. 16, 2007

(65) Prior Publication Data

US 2008/0248400 A1 Oct. 9, 2008

(30) Foreign Application Priority Data

Apr. 4, 2007 (KR) .................. 10-2007-0033311

(51) Int. Cl.
H01M 4/48 (2010.01)
(52) U.S. Cl. .............. 429/231.3; 429/231.1; 429/231.6; 429/231.95; 429/231.8; 429/231.5; 429/218.1; 429/330; 429/332; 429/341; 429/342; 429/338; 427/58; 427/126.4; 427/126.3; 252/182.1
(58) Field of Classification Search .............. 429/231.3, 429/231.1, 231.2, 231.4, 231.8, 330, 332, 429/341, 231.6, 231.95, 231.5, 218.1, 342, 429/338; 427/58, 123, 126.1, 126.3, 126.4, 427/126.5, 126.6; 252/182.1
See application file for complete search history.

(56) References Cited

U.S. PATENT DOCUMENTS

| 7,135,251 | B2* | 11/2006 | Cho et al. ................. 429/231.1 |
| 7,157,186 | B2 | 1/2007 | Nagayama et al. |
| 7,335,446 | B2* | 2/2008 | Chiga et al. ............... 429/231.3 |
| 7,378,190 | B2 | 5/2008 | Yanai et al. |
| 7,473,493 | B2 | 1/2009 | Cho et al. |
| 8,003,252 | B2* | 8/2011 | Jung et al. ................... 429/209 |
| 2003/0082448 | A1* | 5/2003 | Cho et al. ................. 429/218.1 |
| 2003/0211391 | A1 | 11/2003 | Cho et al. |
| 2005/0196674 | A1 | 9/2005 | Chiga et al. |
| 2007/0292764 | A1 | 12/2007 | Soma et al. |
| 2008/0118835 | A1* | 5/2008 | Hur et al. ..................... 429/223 |
| 2010/0173197 | A1 | 7/2010 | Li et al. |

FOREIGN PATENT DOCUMENTS

| CN | 1458704 A | 11/2003 |
| JP | 06-168722 A | 6/1994 |
| JP | 11-016569 A | 1/1999 |
| JP | 2003-272704 A | 9/2003 |
| JP | 2003-331846 A | 11/2003 |
| JP | 2004-220785 A | 8/2004 |
| JP | 2005-243301 A | 9/2005 |
| JP | 2005-268017 A | 9/2005 |
| JP | 2006-169048 A | 6/2006 |
| JP | 2007-234350 | 9/2007 |
| JP | 2007-335331 A | 12/2007 |
| WO | WO 2006/123572 A1 | 11/2006 |

OTHER PUBLICATIONS

Search Report issued on Aug. 7, 2008 in corresponding European patent application No. 07115437 in 5 pages.
Chinese Office Action for Application No. CN 200710148389.4; Applicant: Samsung SDI Co., Ltd., 5 pgs; dated Jan. 29, 2010.
Tukamoto, H. et al., Electronic Conductivity of LiCoO$_2$ and its Enhancement by Magnesium Doping; Solid-State Science and Technology, J. Electrochem. So., vol. 144, No. 9, Sep. 1997 pp. 3164-3168, The Electrochemical Society, Inc.
Japanese Office Action corresponding to Japanese Office Action No. 2007-196179 dated Dec. 15, 2010.

* cited by examiner

Primary Examiner — Laura Weiner
(74) Attorney, Agent, or Firm — Knobbe Martens Olson & Bear LLP (57) ABSTRACT

A positive electrode includes a current collector and a positive electrode active material layer. The positive electrode active material layer includes a positive electrode active material including a core including a compound $Li_aCO_{1-b}M_bO_2$ and a surface-treatment layer. In the core compound, $0.95 \leq a \leq 1.1$, $0.002 \leq b \leq 0.02$, and M is one or more elements selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po. The surface-treatment layer includes a compound including element of P, and one or more elements selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, As, Sb, Bi, S, Se, Te, Po.

22 Claims, 1 Drawing Sheet

US 8,268,486 B2

POSITIVE ELECTRODE FOR RECHARGEABLE LITHIUM BATTERY AND RECHARGEABLE LITHIUM BATTERY INCLUDING SAME

CROSS-REFERENCE TO RELATED APPLICATION

This application claims the benefit of Korean Patent Application No. 2007-0033311 filed in the Korean Intellectual Property Office on Apr. 4, 2007, the entire content of which is incorporated herein by reference.

BACKGROUND

1. Field

The present invention relates to a positive electrode for a rechargeable lithium battery and a rechargeable lithium battery comprising the same. More particularly, the present invention relates to a positive electrode for a rechargeable lithium battery that has good thermal safety and cycle-life at a high voltage.

2. Description of the Related Technology

A lithium rechargeable battery has recently drawn attention as a power source for small portable electronic devices. It uses an organic electrolyte solution and thereby has the discharge voltage twice as high as that a battery using an alkali aqueous solution, and accordingly has high energy density. For positive electrode active materials of a rechargeable lithium battery, lithium-transition element composite oxides being capable of intercalating lithium comprising $LiCoO_2$, $LiMn_2O_4$, $LiNiO_2$, $LiNi_{1-x}Co_xO_2$ (0<x<1), $LiMnO_2$ have been researched. As for a negative electrode active material of a rechargeable lithium battery, various carbon-based materials such as artificial and natural graphite and hard carbon have been used, which can all intercalate and deintercalate lithium ions. Graphite of the carbon-based material increases discharge voltages and energy density for a battery because it has a low discharge potential of −0.2V, compared to lithium. A battery using graphite as a negative electrode active material has a high average discharge potential of 3.6V and high energy density. Furthermore, graphite is comprehensively used among the aforementioned carbon-based materials since graphite provides better cycle life for a battery due to its outstanding reversibility. However, a graphite active material has a low density and consequently a low capacity in terms of energy density per unit volume when using the graphite as a negative electrode active material. Further, it involves some hazards such as explosion or combustion when a battery is misused or overcharged, because graphite is likely to react with an organic electrolyte at a high discharge voltage.

SUMMARY

One embodiment of the present invention provides a positive electrode for a rechargeable lithium battery with improved cycle-life and thermal safety at a high voltage.

Another embodiment of the present invention provides a rechargeable lithium battery comprising the positive electrode.

An embodiment of the present invention provides a positive electrode that comprises a current collector and a positive electrode active material layer disposed on the current collector. The positive electrode active material layer comprises a positive electrode active material comprising a core including a compound of the following Formula 1, and a surface-treatment layer disposed on the core. The surface-treatment layer comprises a compound comprising element P, and one or more element selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, As, Sb, Bi, S, Se, Te, and Po.

$$Li_aCo_{1-b}M_bO_2 \quad \text{(Formula 1)}$$

In the Formula 1, $0.95 \leq a \leq 1.1$, $0.002 \leq b \leq 0.02$, and M is one or more elements selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, As, Sb, Bi, S, Se, Te, and Po.

The element P of the surface-treatment layer is present in an amount of 0.001 to 6 wt % based on the weight of Co in the compound Formula 1. According to one embodiment, the element P is present in an amount of 0.005 to 4.883 wt % based on the weight of Co in the compound Formula 1.

According to one embodiment, the surface-treatment layer comprises element P, and further comprising one or more elements selected from the group consisting of Al, Mg, Zr, Ti, Ba, B, Si, Fe, and combinations thereof.

Another embodiment of the present invention provides a rechargeable lithium battery comprising the above positive electrode, a negative electrode comprising a negative electrode active material being capable of intercalating and deintercalating lithium ions, and a non-aqueous electrolyte comprising a non-aqueous organic solvent and a lithium salt. The battery shows charge cut-off voltages ranging from 4.2 to 4.5V.

The lithium salt comprises at least one material selected from the group consisting of $LiPF_6$, $LiBF_4$, $LiSbF_6$, $LiAsF_6$, $LiClO_4$, $LiCF_3SO_3$, $LiC_4F_9SO_3$, $LiN(CF_3SO_2)_2$, $LiN(C_2F_5SO_2)_2$, $LiAlO_4$, $LiAlCl_4$, $LiN(C_pF_{2p+1}SO_2)(C_qF_{2q+1}SO_2)$, wherein p and q are natural numbers, $LiSO_3CF_3$, $LiCl$, $LiI$, and $LiB(C_2O_4)_2$.

The lithium salt may be used at a 0.1 to 2.0M concentration.

The negative electrode active material comprises at least one material selected from the group consisting of lithium, a metal being capable of alloying with lithium, a material being capable of reversibly forming a lithium-containing compound by reaction with lithium ions, and a material being reversibly capable of intercalating and deintercalating lithium ions.

The metal being capable of alloying with lithium comprises one or more selected from the group consisting of Na, K, Rb, Cs, Fr, Be, Mg, Ca, Sr, Ba, Ra, Al, and Sn.

The material being capable of reversibly forming a lithium-containing compound by reaction with lithium ions comprises one or more selected from the group consisting of tin oxide, silicon oxide, titanium nitrate, and silicon (Si).

The material reversibly capable of intercalating and deintercalating lithium ions comprises a carbon-based material.

The carbon-based material may be amorphous carbon or crystalline carbon.

The non-aqueous organic solvent comprises one or more selected from the group consisting of a carbonate-based solvent, an ester-based solvent, an ether-based solvent, a ketone-based solvent, an alcohol-based solvent, and an aprotic solvent.

DETAILED DESCRIPTION OF EMBODIMENTS

Recently, as requirements for high-capacity and high voltage batteries have increased, research into increasing capacity of a rechargeable lithium battery has been undertaken. High voltage rechargeable lithium batteries may have deteriorated safety due to a side-reaction between a positive electrode active material and an electrolyte, which may cause combustion or cause cycle-life characteristics to be significantly deteriorated.

According to one embodiment, a positive electrode comprises a positive electrode active material that can suppress a side-reaction with an electrolyte solution, and can thereby provide a rechargeable lithium battery having improved thermal safety and cycle-life characteristics.

The positive electrode comprises a current collector and a positive electrode active material layer disposed on the current collector. The positive electrode active material layer comprises a positive electrode active material including a core including a compound and a surface-treatment layer disposed on the core.

The core compound is represented by the Formula 1, $Li_aCO_{1-b}M_bO_2$, as discussed in the above.

In the Formula 1, $0.95 \leq a \leq 1.1$, $0.002 \leq b \leq 0.02$, and M is one or more selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, As, Sb, Bi, S, Se, Te, and Po. According to one embodiment, M is Mg.

In the compound of the above Formula 1, the doping element M is uniformly present in the entire core compound. The doping element stabilizes the structure of the active material and thereby improves battery safety and cycle-life characteristics.

The doping element M is present in an amount of 0.2 to 2 mole % based on the sum of Co and the doping element M. According to one embodiment, the doping element M is present in an amount of 0.3 to 0.9 mole % based on the sum of Co and the doping element M. When the doping element M is present at less than 0.2 mole %, safety is not sufficiently improved, whereas when it is present at more than 2 mole %, battery capacity decreases.

The surface-treatment layer comprises a compound including element P, and one or more elements selected from the group consisting of Mg, Ca, Sr, Ba, Ra, Sc, Y, Tl, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Ti, Si, Ge, Sn, As, Sb, Bi, S, Se, Te, and Po. According to one embodiment, the compound may be an oxide comprising the element P and the one or more additional elements. According to another embodiment, the compound may be an oxide comprising Mg or Al, and P.

The element P of the surface-treatment layer is present in an amount of 0.001 to 6 wt % based on the weight of Co in the compound of the above Formula 1. According to one embodiment, the element P is present in an amount of 0.005 to 4.883 wt % based on the weight of Co in the compound of the above Formula 1. According to another embodiment, the element P is present in an amount of 0.015 to 4.883 wt % based on the weight of Co in the compound of the above Formula 1. When the element P is within the range, it can improve battery safety and cycle-life characteristic. However, when out of the range and included in an amount of less than 0.001 wt %, it may have no influence on battery safety. Likewise, when present in an amount of more than 6 wt %, a surface-treatment layer may generate gas, deteriorating reliability at a high temperature.

In addition, the surface-treatment layer may have a weight in a range from 0.2 to 5 wt % based on the entire weight of the positive electrode active material. According to another embodiment of the present invention, it may be in a range of 0.2 to 4.5 wt %. When a surface-treatment layer is included in a positive electrode active material in the above range, it can improve safety and cycle-life characteristics.

In addition, the surface-treatment layer may comprise the element P and the one or more additional elements in a weight ratio of 0.2:1 to 1:0.2. According to another embodiment of the present invention, it may include them in a weight ratio of 0.5:1 to 1:0.5. When the elements are included in the range, an expected compound for a surface-treatment layer, that is, $AlPO_4$, $Mg_3(PO_4)_2$ can be well-prepared. However, when out of the range, an expected compound for a surface-treatment layer cannot be well-prepared, but also some of the starting materials do not react completely but may remain.

Therefore, when a positive electrode is prepared by using a positive electrode active material comprising a surface-treatment layer, the surface of the positive electrode is covered with a coating material, thereby suppressing a negative reaction with an electrolyte solution and providing an improved cycle-life characteristic. In addition, since the surface-treatment layer is nonflammable, it can improve battery safety.

In other words, when a positive electrode active material is treated with doping and coating materials, the doping material can improve structural safety of the positive electrode active material itself and thereby enhance the cycle-life characteristic and safety. The coating material plays a role of covering the surface of the positive electrode active material, suppressing a positive electrode from negatively reacting with the electrolyte solution, and thereby improving cycle-life characteristic. In particular, the coating material is inflammable and can thereby improve battery safety.

The positive electrode active material layer comprises a binder and optionally a conductive agent as well as the positive electrode active material.

The binder may be selected from the group consisting of polyvinylalcohol, carboxylmethylcellulose, hydroxypropylenecellulose, diacetylenecellulose, polyvinylchloride, polyvinylpyrrolidone, polytetrafluoroethylene, polyvinylidene fluoride, polyethylene, or polypropylene, but is not limited thereto.

Any electrically conductive material can be used as a conductive material unless it causes any chemical change. Examples of the conductive material comprise natural graphite, artificial graphite, carbon black, acetylene black, ketjen black, a carbon fiber, a metal powder or a metal fiber comprising copper, nickel, aluminum, silver, and so on, or a polyphenylene derivative.

The current collector may be selected from the group consisting of an aluminum foil, a copper foil, a nickel foil, a stainless steel foil, a titanium foil, a nickel foam, an aluminum foam, a polymer substrate coated with a conductive metal, and combinations thereof. According to one embodiment, an aluminum foil may be appropriate.

The positive electrode can be fabricated as follows: a positive electrode active material composition is prepared by mixing a positive electrode active material, a binder, and optionally a conductive agent, and then the composition is applied on a positive current collector followed by drying and compressing.

The positive electrode active material composition may be applied using a method selected from the group consisting of screen printing, spray coating, a coating method with a doctor blade, gravure coating, dip coating, silk screen, painting, and slot die coating, depending on viscosity of the composition, but is not limited thereto. According to one embodiment, screen printing may be suitable.

An active mass density of the positive electrode may be adjusted in the fabrication of the positive electrode by controlling the pressure and the frequency and temperature of compressing. Compressing processes may be easily controlled by the ordinarily skilled in the art in order to obtain an intended active mass density.

Another embodiment of the present invention also provides a rechargeable lithium battery comprising the positive electrode.

A rechargeable lithium battery according to the embodiment comprises the positive electrode, a negative electrode including a negative electrode active material that can intercalate and deintercalate lithium ions, and an electrolyte including a non-aqueous organic solvent and a lithium salt. The rechargeable lithium battery may have charge cut-off voltages ranging from 4.2 to 4.5V. According to another embodiment of the present invention, the charge cut-off voltages may be in a range of 4.3 to 4.5V.

The positive electrode included in the rechargeable lithium battery is the same as aforementioned.

The negative electrode comprises a current collector and a negative electrode active material layer formed on the current collector.

The negative electrode active material may be selected from the group consisting of a lithium metal, a lithium alloy, a material that can react with lithium and thereby form a lithium-containing compound, and a material that can reversibly intercalate and deintercalate lithium ions.

The lithium alloy may comprise an alloy of lithium and one or more metals selected from the group consisting of Na, K, Rb, Cs, Fr, Be, Mg, Ca, Sr, Ba, Ra, Al, and Sn.

The material that can react with lithium and form a lithium-containing compound may representatively comprise tin oxide ($SnO$, $SnO_2$), titanium nitrate, silicon oxide ($SiO$, $SiO_x$ ($X<2$)), and silicon, but is not limited thereto.

The material that can reversibly intercalate and deintercalate lithium ions may representatively comprise a carbon-based material.

The carbon-based material may be amorphous carbon or crystalline carbon. The amorphous carbon may be a soft carbon (carbon obtained by firing at a low temperature), a hard carbon (carbon obtained by firing at a high temperature), mesophase pitch carbide, fired coke, and so on, and the crystalline carbon may be non-shaped, or sheet, flake, spherical, or fiber shaped natural graphite or artificial graphite.

The carbonaceous material has an Lc (crystallite size) of at least 10 nm found through X-ray diffraction. According to one embodiment, the material has an Lc (crystallite size) of 10 to 1500 nm found through X-ray diffraction. The carbonaceous material exhibits an exothermic peak at 700° C. or more. The exothermic peak differentiates crystalline or amorphous carbon. The exothermic peak at 700° C. or more indicates crystalline carbon, and therefore the maximum value of exothermic temperature need not to be limited.

The negative electrode active material of the negative electrode comprises a binder or a conductive agent as well as a negative electrode active material.

The binder and conductive agent are the same as described in the positive electrode active material layer.

The negative electrode can be fabricated as follows: a negative electrode active material composition is prepared by mixing a negative electrode active material, a binder, and optionally a conductive agent, and then the composition is applied on a negative current collector followed by drying and compressing. The negative electrode manufacturing method is well known, and thus it is not described in detail in the present specification.

The solvent comprises N-methylpyrrolidone, but is not limited thereto.

The current collector may comprises one or more selected from the group consisting of a copper foil, a nickel foil, a stainless steel foil, a titanium foil, a nickel foam, a copper foam, and a polymer substrate coated with a conductive metal. According to one embodiment, a copper foil or a nickel foil may be appropriate.

In the rechargeable battery according to one embodiment of the present invention, the electrolyte comprises a non-aqueous organic solvent and a lithium salt.

The lithium salts act as a lithium-ion source, helping basic battery operation.

According to one embodiment of the present invention, the lithium salt comprises at least one material selected from the group consisting of $LiPF_6$, $LiBF_4$, $LiSbF_6$, $LiAsF_6$, $LiClO_4$, $LiCF_3SO_3$, $LiC_4F_9SO_3$, $LiN(CF_3SO_2)_2$, $LiN(C_2F_5SO_2)_2$, $LiAlO_4$, $LiAlCl_4$, $LiN(C_pF_{2p+1}SO_2)(C_qF_{2q+1}SO_2)$, wherein p and q are natural numbers, $LiSO_3CF_3$, LiCl, LiI, and $LiB(C_2O_4)_2$.

The lithium salt may be used at a 0.1 to 2.0M concentration. According to one embodiment, the lithium salt may be used at a 0.7 to 1.6 M concentration. When the lithium salt concentration is less than 0.1M, electrolyte performance may be deteriorated due to low electrolyte conductivity, whereas when it is more than 2.0M, lithium ion mobility may be reduced due to an increase of electrolyte viscosity.

The non-aqueous organic solvent acts as a medium for transmitting ions taking part in the electrochemical reaction of the battery. The non-aqueous organic solvent may comprise a carbonate-based, ester-based, ether-based, ketone-based, alcohol-based, or aprotic solvent. Examples of the carbonate-based solvent may comprise dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and so on. Examples of the ester-based solvent may comprise n-methyl acetate, n-ethyl acetate, n-propyl acetate, dimethylacetate, methylpropionate, ethylpropionate, γ-butyrolactone, decanolide, valerolactone, mevalonolactone, caprolactone, and so on. Examples of the ether-based solvent comprise dibutyl ether, tetraglyme, diglyme, dimethoxyethane, 2-methyltetrahydrofuran, tetrahydrofuran, and so on, and examples of the ketone-based solvent comprise cyclohexanone and so on. Examples of the alcohol-based solvent comprise ethanol, isopropyl alcohol, and so on. Examples of the aprotic solvent comprise nitriles such as X—CN (wherein R is a C2 to C20 linear, branched, or cyclic hydrocarbon, a double bond, an aromatic ring, or an ether bond), amides such as dimethylformamide, dioxolane such as 1,3-dioxolane, sulfolane, and so on.

The non-aqueous organic solvent may be used singularly or in a mixture. When the organic solvent is used in a mixture, the mixture ratio can be controlled in accordance with desirable battery performance.

The carbonate-based solvent may comprise a mixture of a cyclic carbonate and a chain carbonate. The cyclic carbonate and the chain carbonate are mixed together in the volume ratio of 1:1 to 1:9, and when the mixture is used as an electrolyte the electrolyte performance may be enhanced.

In addition, the electrolyte according to one embodiment of the present invention may further comprise mixtures of carbonate-based solvents and aromatic hydrocarbon-based solvents. The carbonate-based solvents and the aromatic hydrocarbon-based solvents are preferably mixed together in a volume ratio of 1:1 to 30:1.

The aromatic hydrocarbon-based organic solvent may be represented by the following Formula 2.

(Formula 2)

In the Formula 2, $R_1$ to $R_6$ are independently selected from the group consisting of hydrogen, a halogen, a $C_1$ to $C_{10}$ alkyl, a haloalkyl, and combinations thereof.

The aromatic hydrocarbon-based organic solvent may comprise, but is not limited to, at least one selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, and xylene.

The electrolyte may further comprise an additive to improve cell characteristics. Specific examples of the additive comprise an ethylene carbonate-based compound represented by the following Formula 3 to improve thermal safety of a rechargeable lithium battery.

(Formula 3)

In the Formula 3, X and Y are independently selected from the group consisting of hydrogen, a halogen, a cyano (CN), a nitro ($NO_2$), and a fluorinated C1 to C5 alkyl, provided that at least one of X and Y is selected from the group consisting of a halogen, a cyano (CN), a nitro ($NO_2$), and a fluorinated C1 to C5 alkyl.

According to one embodiment, the ethylene carbonate-based compound may comprise one or more selected from the group consisting of ethylene carbonate, fluoroethylene carbonate, difluoroethylene carbonate, chloroethylene carbonate, dichloroethylene carbonate, bromoethylene carbonate, dibromoethylene carbonate, nitroethylene carbonate, and cyanoethylene carbonate. According to another embodiment, fluoroethylene carbonate may be appropriate.

The ethylene carbonate-based additive is not limited by a specific amount, and may be added in an appropriate amount to obtain thermal safety.

The rechargeable lithium battery generally comprises a separator between the positive electrode and the negative electrode. The separator may comprise polyethylene, polypropylene, polyvinylidene fluoride, or multilayers thereof, such as a polyethylene/polypropylene bilayered separator, a polyethylene/polypropylene/polyethylene three-layered separator, or a polypropylene/polyethylene/polypropylene three-layered separator.

Figure 1:
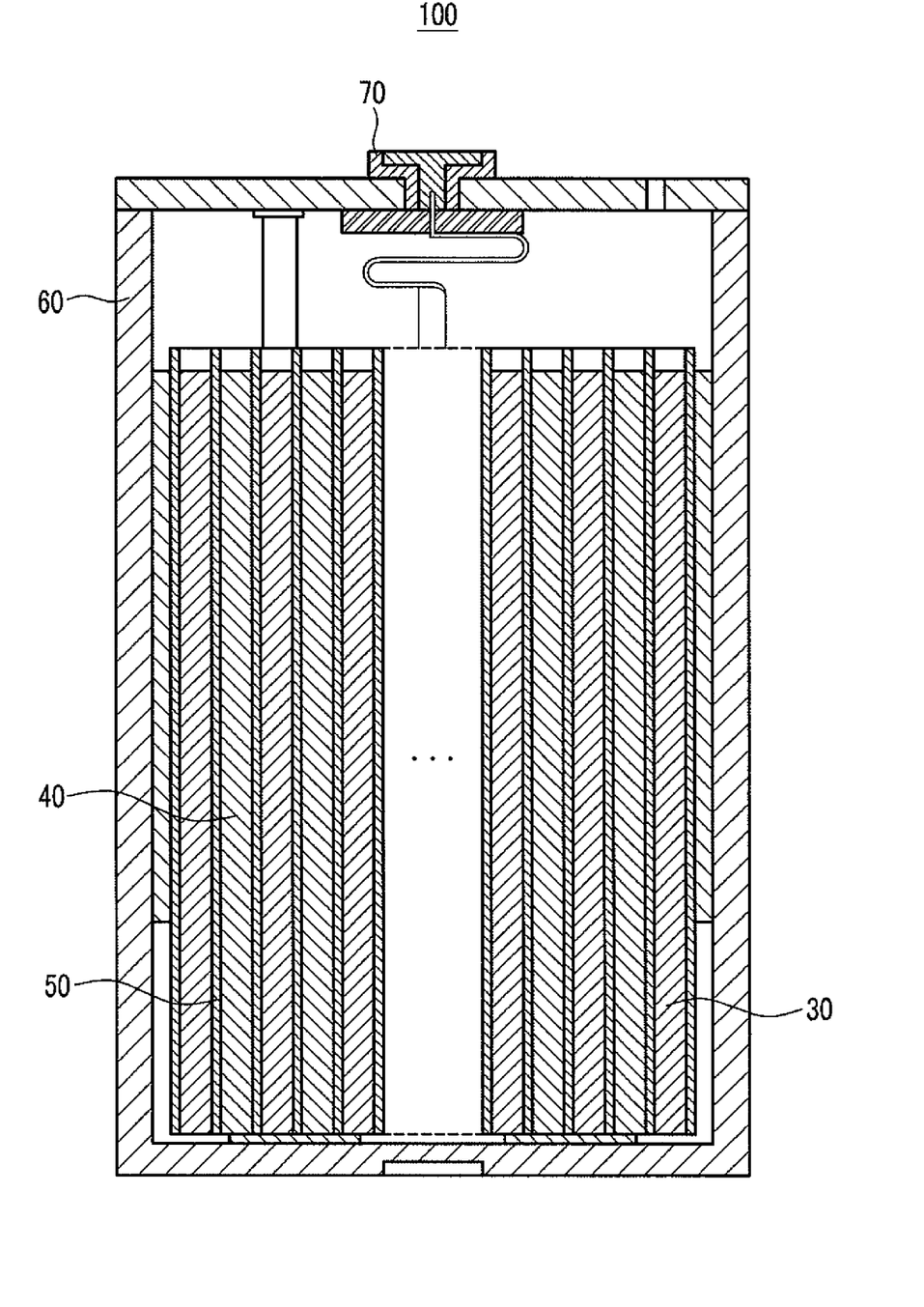
FIG. 1 is a schematic cross-sectional view of a rechargeable lithium battery according to one embodiment of the present invention.

FIG. 1 is a schematic cross-sectional view of a rechargeable lithium battery according to one embodiment of the present invention. Referring to FIG. 1, the rechargeable lithium battery 100 is mainly constructed of a positive electrode 30, a negative electrode 40, a separator 50 interposed between the positive electrode 30 and the negative electrode 40, and an electrolyte in which the separator 50 is immersed, and in addition, a cell case 60 and a sealing member 70 sealing the cell case 60.

The rechargeable lithium battery 100 having the structure may be fabricated as follows: an electrode assembly comprising a positive electrode 30, a negative electrode 40, and a separator 50 interposed between the positive electrode 30 and the negative electrode 40 is placed in a battery case 60; electrolyte is provided through the opening of the battery case 60; and the case is sealed with a cap plate and a gasket as a sealing member 70.

The following examples illustrate the embodiments of the present invention in more detail. However, the following examples of the present invention are merely examples, and the present invention is not limited thereto.

EXAMPLE 1

$Co_3O_4$ powder was mixed with $Li_2CO_3$ powder and $Mg(OH)_2$ powder in a mole ratio of 0.998:1:0.002 to prepare a solid-phase mixture. The mixture was dried at 110° C. for 4 hours, and then heat-treated at 800° C. for 10 hours, preparing a $LiCo_{0.998}Mg_{0.002}O_2$ positive electrode active material core having an average particle diameter of 15 μm.

Next, $(NH_4)_2HPO_4$, which is a P-containing salt including P, was mixed with $Mg(NO_3)_{2.9}H_2O$, which is a Mg salt, in a mole ratio of 2:3 in 100 ml of water, preparing a coating liquid. The $LiCo_{0.998}Mg_{0.002}O_2$ positive electrode active material core having an average particle diameter of 15 μm was added to 100 ml of the coating liquid. The mixture was dried at 130° C. for 30 minutes.

The dried powder was heat-treated at 700° C. for 5 hours, preparing a positive electrode active material coated with a surface treatment layer comprising a $Mg_3(PO_4)_2$ compound on the surface of $LiCo_{0.998}Mg_{0.002}O_2$. The surface treatment layer had a weight of 1 g for every 100 g of the positive electrode active material.

Then, the $LiCo_{0.998}Mg_{0.002}O_2$ positive electrode active material, polyvinylidene fluoride (PVDF), and carbon (Super-P) were dispersed in a weight ratio of 94/3/3 into N-methyl-2-pyrrolidone, preparing a composition for forming a positive electrode active material layer. This slurry was coated on a 20 μm-thick aluminum foil, and was dried and compressed to prepare a positive electrode. Herein, the positive electrode had an active mass density of 3.7 g/cc.

On the other hand, a negative electrode slurry was prepared by mixing carbon and PVDF in a weight ratio of 94:6, and then dispersing the mixture into N-methyl-2-pyrrolidone. This slurry was coated on a 15 μm-thick copper foil, and then dried and compressed, preparing a negative electrode.

A 15 μm-thick polyethylene separator was interposed between the fabricated positive and negative electrodes, and then spirally-wound and compressed together. Then, an electrolyte solution was inserted to fabricate an 18650 cylindrical battery cell. Herein, the electrolyte solution was prepared by dissolving 1.0M of $LiPF_6$ to a non-aqueous organic solvent in which ethylene carbonate/dimethyl carbonate/ethylmethyl carbonate (EC/DMC/EMC) were mixed in a volume ratio of 3/3/4.

EXAMPLES 2 to 10

18650 cylindrical battery cells were fabricated in the same method as in Example 1, except that the mixing ratio of $Co_3O_4$ powder, $Li_2CO_3$ powder, and $Mg(OH)_2$ powder was changed to mole ratios of Li, Co, and Mg shown in Tables 1 and 2.

EXAMPLES 11 to 20

18650 cylindrical battery cells were fabricated in the same method as in Example 1, except that the mixing ratio of a $Co_3O_4$ powder, a $Li_2CO_3$ powder, and a $Mg(OH)_2$ powder was changed to a mole ratio of Li, Co, and Mg in Table 2 to prepare a positive electrode active material core, and then $(NH_4)_2HPO_4$, which is a P-containing salt, and $Al(NO_3)_{3.9}H_2O$, which is an Al-containing salt, were mixed in a mole ratio of 1:1 in 100 ml of water to prepare a coating liquid and the coating liquid was coated on the positive electrode active material core.

COMPARATIVE EXAMPLE 1

A composition for forming a positive electrode active material was prepared by dispersing $LiCoO_2$, polyvinylidene fluoride (PVDF), and carbon (Super-P) in a weight ratio of 94/3/3 in N-methyl-2-pyrrolidone. This slurry was coated on a 20 μm-thick aluminum foil and compressed to prepare a positive electrode.

Likewise, a negative electrode slurry was prepared by mixing carbon as a negative electrode active material and PVDF as a binder in a weight ratio of 94:6 and dispersing the mixture in N-methyl-2-pyrrolidone. This slurry was coated on a 15 μm-thick copper foil, then dried and compressed to prepare a negative electrode.

A 15 μm-thick polyethylene separator was interposed between the fabricated positive and negative electrode and then spirally wound, and compressed. Then, an electrolyte solution was injected to fabricate an 18650 cylindrical battery cell. Herein, the electrolyte solution was prepared by dissolving 1.0M of $LiPF_6$ in a non-aqueous organic solvent in which ethylene carbonate/dimethyl carbonate/ethylmethyl carbonate (EC/DMC/EMC/) were mixed in a volume ratio of 3/3/4.

COMPARATIVE EXAMPLES 2 to 11

A positive electrode active material was prepared by changing the mixing ratio of a $Co_3O_4$ powder, a $Li_2CO_3$ powder, and a $Mg(OH)_2$ powder in a mole ratio of Li, Co, and Mg in Table 1. An 18650 cylindrical battery was fabricated in the same method as in Comparative Example 1, except for using the positive electrode active material.

COMPARATIVE EXAMPLE 12

18650 cylindrical battery cells were fabricated in the same method as in Comparative Example 1, except that $LiCoO_2$ was mixed with $(NH_4)_2HPO_4$, which is a P-containing salt, and $Mg(NO_3)_{2.9}H_2O$, which is a Mg-containing salt, in a weight ratio of 1:1.5 in 100 ml of water to prepare a coating liquid.

EXAMPLES 21 to 40

A $LiCo_{0.99}Mg_{0.01}O_2$ positive electrode active material core was prepared by mixing a $Co_3O_4$ powder, a $Li_2CO_3$ powder, and $Mg(OH)_2$ in a mole ratio of 0.99:1:0.01.

Then, $(NH_4)_2HPO_4$, a P-containing salt, and $Mg(NO_3)_{2.9}H_2O$, a Mg-containing salt, were mixed in a changed mole ratio of P and Mg in Table 4 in 100 ml of water, preparing a coating liquid.

18650 cylindrical battery cells were fabricated in the same method as in Example 1, except that the $LiCo_{0.99}Mg_{0.01}O_2$ positive electrode active material core was coated with the coating liquid to prepare a positive electrode active material.

EXAMPLES 41 to 60

A P-containing salt, $(NH_4)_2HPO_4$, and an Al-containing salt, $Al(NO_3)_{3.9}H_2O$, were mixed in a changed mole ratio of P and Al as shown in Tables 4 and 5 in 100 ml of water to prepare a coating liquid. Then, 18650 cylindrical battery cells were fabricated in the same method as in Examples 21 to 40, except for using the coating liquid.

COMPARATIVE EXAMPLES 13 to 19

A P-containing salt, $(NH_4)_2HPO_4$, and a Mg-containing salt, $Mg(NO_3)_{2.9}H_2O$, were mixed in a changed mole ratio of P and Mg as shown in Table 3 in 100 ml of water to prepare a coating liquid. Then, an 18650 cylindrical battery cell was fabricated in the same method as in Comparative Example 12 except for using the coating liquid.

18650 cylindrical batteries fabricated according to the examples and comparative examples were charged and discharged once with 0.2 C rate for a formation process. They were then charged with a 0.5 C rate and discharged with a 0.2 C rate once for a standard process. These formation and standard processes were performed while changing charge cut-off voltages to 4.2V, 4.35V, and 4.5V. Then, the 18650 cylindrical battery cells were charged and discharged at a 1.0 C rate 300 times to test 25° C. cycle-life. The results are provided in Tables 1 to 5. In addition, batteries according to Examples 1 to 60 after the standard process were examined regarding average capacity at 4.2V, 4.35V, and 4.5V. In addition, batteries with a doping amount of 2.5 mole % were examined regarding capacity at 4.2V, 4.35V, and 4.5V. These results are shown in Table 6.

TABLE 1

| | Core of positive electrode active material | Coating | P content of positive electrode active material relative to Co content (wt %) measured by ICP analysis | Penetration result at 4.2 V | 300th cycle-life at 25° C. during 4.2 V charging (%) | Penetration result at 4.35 V | 300th cycle-life at 25° C. during 4.35 V charging (%) | Penetration result at 4.5 V | 300th cycle-life at 25° C. during 4.5 V charging (%) |
|---|---|---|---|---|---|---|---|---|---|
| Comp. Ex. 1 | $LiCoO_2$ | — | 0 | No fire | 70 | Fire | 23 | Fire | 10 |
| Comp. Ex. 2 | $LiCo_{0.998}Mg_{0.002}O_2$ | — | 0 | No fire | 70 | Fire | 26 | Fire | 21 |
| Comp. Ex. 3 | $LiCo_{0.996}Mg_{0.004}O_2$ | — | 0 | No fire | 70 | Fire | 34 | Fire | 29 |
| Comp. Ex. 4 | $LiCo_{0.994}Mg_{0.006}O_2$ | — | 0 | No fire | 70 | Fire | 41 | Fire | 37 |
| Comp. Ex. 5 | $LiCo_{0.992}Mg_{0.008}O_2$ | — | 0 | No fire | 70 | No fire | 46 | No fire | 41 |
| Comp. Ex. 6 | $LiCo_{0.99}Mg_{0.01}O_2$ | — | 0 | No fire | 70 | No fire | 48 | No fire | 43 |
| Comp. Ex. 7 | $LiCo_{0.988}Mg_{0.012}O_2$ | — | 0 | No fire | 70 | No fire | 51 | No fire | 45 |
| Comp. Ex. 8 | $LiCo_{0.986}Mg_{0.014}O_2$ | — | 0 | No fire | 70 | No fire | 51 | No fire | 45 |
| Comp. Ex. 9 | $LiCo_{0.984}Mg_{0.016}O_2$ | — | 0 | No fire | 70 | No fire | 52 | No fire | 47 |
| Comp. Ex. 10 | $LiCo_{0.982}Mg_{0.018}O_2$ | — | 0 | No fire | 70 | No fire | 53 | No fire | 48 |
| Comp. Ex. 11 | $LiCo_{0.980}Mg_{0.02}O_2$ | — | 0 | No fire | 70 | No fire | 55 | No fire | 51 |
| Comp. Ex. 12 | $LiCoO_2$ | Mg and P coating | 0.98 | No fire | 76 | Fire | 71 | Fire | 65 |
| Ex. 1 | $LiCo_{0.998}Mg_{0.002}O_2$ | Mg and P coating | 0.98 | No fire | 75 | Fire | 72 | Fire | 68 |
| Ex. 2 | $LiCo_{0.996}Mg_{0.004}O_2$ | Mg and P coating | 0.98 | No fire | 76 | No fire | 75 | No fire | 69 |
| Ex. 3 | $LiCo_{0.994}Mg_{0.006}O_2$ | Mg and P coating | 0.98 | No fire | 74 | No fire | 76 | No fire | 66 |
| Ex. 4 | $LiCo_{0.992}Mg_{0.008}O_2$ | Mg and P coating | 0.98 | No fire | 78 | No fire | 74 | No fire | 70 |
| Ex. 5 | $LiCo_{0.99}Mg_{0.01}O_2$ | Mg and P coating | 0.98 | No fire | 85 | No fire | 78 | No fire | 73 |

TABLE 2

| | Core of positive electrode active material | Coating | P content of positive electrode active material relative to Co content (wt %) measured by ICP analysis | 4.2 V penetration result | 300th cycle-life (%) at 25° C. During 4.2 V charge | 4.35 V penetration result | 300th cycle-life (%) At 25° during 4.35 V charge | 4.5 V penetration result | 300th cycle-life (%) At 25° During 4.5 V charge |
|---|---|---|---|---|---|---|---|---|---|
| Ex. 6 | $LiCo_{0.988}Mg_{0.012}O_2$ | Mg and P coating | 0.98 | No fire | 80 | No fire | 85 | No fire | 70 |
| Ex. 7 | $LiCo_{0.986}Mg_{0.014}O_2$ | Mg and P coating | 0.98 | No fire | 78 | No fire | 80 | No fire | 69 |
| Ex. 8 | $LiCo_{0.984}Mg_{0.016}O_2$ | Mg and P coating | 0.98 | No fire | 76 | No fire | 78 | No fire | 68 |
| Ex. 9 | $LiCo_{0.982}Mg_{0.018}O_2$ | Mg and P coating | 0.98 | No fire | 71 | No fire | 76 | No fire | 64 |

TABLE 2-continued

| | Core of positive electrode active material | Coating | P content of positive electrode active material relative to Co content (wt %) measured by ICP analysis | 4.2 V penetration result | 300th cycle-life (%) at 25° C. During 4.2 V charge | 4.35 V penetration result | 300th cycle-life (%) At 25° during 4.35 V charge | 4.5 V penetration result | 300th cycle-life (%) At 25° During 4.5 V charge |
|---|---|---|---|---|---|---|---|---|---|
| Ex. 10 | $LiCo_{0.980}Mg_{0.02}O_2$ | Mg and P coating | 0.98 | No fire | 70 | No fire | 71 | No fire | 62 |
| Ex. 11 | $LiCo_{0.998}Mg_{0.002}O_2$ | Al and P coating | 0.98 | No fire | 74 | Fire | 70 | Fire | 62 |
| Ex. 12 | $LiCo_{0.996}Mg_{0.004}O_2$ | Al and P coating | 0.98 | No fire | 74 | No fire | 74 | No fire | 63 |
| Ex. 13 | $LiCo_{0.994}Mg_{0.006}O_2$ | Al and P coating | 0.98 | No fire | 73 | No fire | 73 | No fire | 66 |
| Ex. 14 | $LiCo_{0.992}Mg_{0.008}O_2$ | Al and P coating | 0.98 | No fire | 75 | No fire | 75 | No fire | 67 |
| Ex. 15 | $LiCo_{0.99}Mg_{0.01}O_2$ | Al and P coating | 0.98 | No fire | 83 | No fire | 83 | No fire | 69 |
| Ex. 16 | $LiCo_{0.988}Mg_{0.012}O_2$ | Al and P coating | 0.98 | No fire | 77 | No fire | 77 | No fire | 69 |
| Ex. 17 | $LiCo_{0.986}Mg_{0.014}O_2$ | Al and P coating | 0.98 | No fire | 76 | No fire | 76 | No fire | 68 |
| Ex. 18 | $LiCo_{0.984}Mg_{0.016}O_2$ | Al and P coating | 0.98 | No fire | 75 | No fire | 75 | No fire | 66 |
| Ex. 19 | $LiCo_{0.982}Mg_{0.018}O_2$ | Al and P coating | 0.98 | No fire | 70 | No fire | 70 | No fire | 62 |
| Ex. 20 | $LiCo_{0.980}Mg_{0.02}O_2$ | Al and P coating | 0.98 | No fire | 68 | No fire | 65 | No fire | 60 |

TABLE 3

| | Core of positive electrode active material | Coating | P content of positive electrode active material relative to Co content (wt %) measured by ICP analysis | Penetration result at 4.2 V | 300th cycle-life at 25° C. during 4.2 V charging (%) | Penetration result at 4.35 V | 300th cycle-life at 25° C. during 4.35 V charging (%) | Penetration result at 4.5 V | 300th cycle-life at 25° C. during 4.5 V charging (%) |
|---|---|---|---|---|---|---|---|---|---|
| Comp. Ex. 13 | $LiCoO_2$ | Mg and P coating | 0.005 | No fire | 71 | Fire | 50 | Fire | 46 |
| Comp. Ex. 14 | $LiCoO_2$ | Mg and P coating | 0.015 | No fire | 72 | Fire | 54 | Fire | 49 |
| Comp. Ex. 15 | $LiCoO_2$ | Mg and P coating | 0.024 | No fire | 73 | Fire | 59 | Fire | 54 |
| Comp. Ex. 16 | $LiCoO_2$ | Mg and P coating | 0.034 | No fire | 74 | Fire | 62 | Fire | 58 |
| Comp. Ex. 17 | $LiCoO_2$ | Mg and P coating | 0.049 | No fire | 75 | Fire | 65 | Fire | 60 |
| Comp. Ex. 18 | $LiCoO_2$ | Mg and P coating | 0.073 | No fire | 76 | Fire | 68 | Fire | 63 |
| Comp. Ex. 19 | $LiCoO_2$ | Mg and P coating | 0.098 | No fire | 76 | Fire | 71 | Fire | 67 |
| Comp. Ex. 20 | $LiCoO_2$ | Mg and P coating | 0.244 | No fire | 78 | No fire | 73 | No fire | 68 |
| Comp. Ex. 21 | $LiCoO_2$ | Mg and P coating | 0.488 | No fire | 79 | No fire | 74 | No fire | 70 |
| Comp. Ex. 22 | $LiCoO_2$ | Mg and P coating | 0.732 | No fire | 80 | No fire | 76 | No fire | 71 |
| Comp. Ex. 23 | $LiCoO_2$ | Mg and P coating | 0.977 | No fire | 81 | No fire | 78 | No fire | 73 |
| Comp. Ex. 24 | $LiCoO_2$ | Mg and P coating | 1.221 | No fire | 82 | No fire | 79 | No fire | 74 |

TABLE 3-continued

| Core of positive electrode active material | Coating | P content of positive electrode active material relative to Co content (wt %) measured by ICP analysis | Penetration result at 4.2 V | 300th cycle-life at 25° C. during 4.2 V charging (%) | Penetration result at 4.35 V | 300th cycle-life at 25° C. during 4.35 V charging (%) | Penetration result at 4.5 V | 300th cycle-life at 25° C. during 4.5 V charging (%) |
|---|---|---|---|---|---|---|---|---|
| Comp. Ex. 25 | LiCoO$_2$ | Mg and P coating | 1.465 | No fire | 84 | No fire | 81 | No fire | 76 |
| Comp. Ex. 26 | LiCoO$_2$ | Mg and P coating | 1.953 | No fire | 85 | No fire | 82 | No fire | 77 |
| Comp. Ex. 27 | LiCoO$_2$ | Mg and P coating | 2.441 | No fire | 88 | No fire | 85 | No fire | 79 |
| Comp. Ex. 28 | LiCoO$_2$ | Mg and P coating | 2.93 | No fire | 84 | No fire | 81 | No fire | 76 |
| Comp. Ex. 29 | LiCoO$_2$ | Mg and P coating | 3.418 | No fire | 82 | No fire | 80 | No fire | 74 |
| Comp. Ex. 30 | LiCoO$_2$ | Mg and P coating | 3.906 | No fire | 81 | No fire | 78 | No fire | 73 |
| Comp. Ex. 31 | LiCoO$_2$ | Mg and P coating | 4.395 | No fire | 80 | No fire | 77 | No fire | 70 |
| Comp. Ex. 32 | LiCoO$_2$ | Mg and P coating | 4.883 | No fire | 76 | No fire | 73 | No fire | 68 |

TABLE 4

| Core of positive electrode active material | Coating | P content of positive electrode active material relative to Co content (wt %) measured by ICP analysis | Penetration result at 4.2 V | 300th cycle-life at 25° C. during 4.2 V charging (%) | Penetration result at 4.35 V | 300th cycle-life at 25° C. during 4.35 V charging (%) | Penetration result at 4.5 V | 300th cycle-life at 25° C. during 4.5 V charging (%) |
|---|---|---|---|---|---|---|---|---|
| Ex. 21 | LiCo$_{0.990}$Mg$_{0.01}$O$_2$ | Mg and P coating | 0.005 | No fire | 76 | No fire | 60 | No fire | 55 |
| Ex. 22 | LiCo$_{0.990}$Mg$_{0.01}$O$_2$ | Mg and P coating | 0.015 | No fire | 77 | No fire | 63 | No fire | 57 |
| Ex. 23 | LiCo$_{0.990}$Mg$_{0.01}$O$_2$ | Mg and P coating | 0.024 | No fire | 78 | No fire | 65 | No fire | 60 |
| Ex. 24 | LiCo$_{0.990}$Mg$_{0.01}$O$_2$ | Mg and P coating | 0.034 | No fire | 79 | No fire | 68 | No fire | 63 |
| Ex. 25 | LiCo$_{0.990}$Mg$_{0.01}$O$_2$ | Mg and P coating | 0.049 | No fire | 80 | No fire | 71 | No fire | 67 |
| Ex. 26 | LiCo$_{0.990}$Mg$_{0.01}$O$_2$ | Mg and P coating | 0.073 | No fire | 83 | No fire | 75 | No fire | 70 |
| Ex. 27 | LiCo$_{0.990}$Mg$_{0.01}$O$_2$ | Mg and P coating | 0.098 | No fire | 85 | No fire | 78 | No fire | 72 |
| Ex. 28 | LiCo$_{0.990}$Mg$_{0.01}$O$_2$ | Mg and P coating | 0.244 | No fire | 86 | No fire | 79 | No fire | 74 |
| Ex. 29 | LiCo$_{0.990}$Mg$_{0.01}$O$_2$ | Mg and P coating | 0.488 | No fire | 87 | No fire | 80 | No fire | 76 |
| Ex. 30 | LiCo$_{0.990}$Mg$_{0.01}$O$_2$ | Mg and P coating | 0.732 | No fire | 87 | No fire | 82 | No fire | 77 |
| Ex. 31 | LiCo$_{0.990}$Mg$_{0.01}$O$_2$ | Mg and P coating | 0.977 | No fire | 87 | No fire | 83 | No fire | 78 |
| Ex. 32 | LiCo$_{0.990}$Mg$_{0.01}$O$_2$ | Mg and P coating | 1.221 | No fire | 88 | No fire | 85 | No fire | 79 |
| Ex. 33 | LiCo$_{0.990}$Mg$_{0.01}$O$_2$ | Mg and P coating | 1.465 | No fire | 89 | No fire | 86 | No fire | 81 |
| Ex. 34 | LiCo$_{0.990}$Mg$_{0.01}$O$_2$ | Mg and P coating | 1.953 | No fire | 90 | No fire | 87 | No fire | 82 |

TABLE 4-continued

| Core of positive electrode active material | Coating | P content of positive electrode active material relative to Co content (wt %) measured by ICP analysis | Penetration result at 4.2 V | 300th cycle-life at 25° C. during 4.2 V charging (%) | Penetration result at 4.35 V | 300th cycle-life at 25° C. during 4.35 V charging (%) | Penetration result at 4.5 V | 300th cycle-life at 25° C. during 4.5 V charging (%) |
| --- | --- | --- | --- | --- | --- | --- | --- | --- |
| Ex. 35 | $LiCo_{0.990}Mg_{0.01}O_2$ | Mg and P coating | 2.441 | No fire | 93 | No fire | 88 | No fire | 83 |
| Ex. 36 | $LiCo_{0.990}Mg_{0.01}O_2$ | Mg and P coating | 2.93 | No fire | 89 | No fire | 85 | No fire | 79 |
| Ex. 37 | $LiCo_{0.990}Mg_{0.01}O_2$ | Mg and P coating | 3.418 | No fire | 87 | No fire | 84 | No fire | 78 |
| Ex. 38 | $LiCo_{0.990}Mg_{0.01}O_2$ | Mg and P coating | 3.906 | No fire | 86 | No fire | 82 | No fire | 77 |
| Ex. 39 | $LiCo_{0.990}Mg_{0.01}O_2$ | Mg and P coating | 4.395 | No fire | 85 | No fire | 81 | No fire | 75 |
| Ex. 40 | $LiCo_{0.990}Mg_{0.01}O_2$ | Mg and P coating | 4.883 | No fire | 81 | No fire | 76 | No fire | 71 |
| Ex. 41 | $LiCo_{0.990}Mg_{0.01}O_2$ | Al and P coating | 0.005 | No fire | 74 | No fire | 56 | No fire | 51 |
| Ex. 42 | $LiCo_{0.990}Mg_{0.01}O_2$ | Al and P coating | 0.015 | No fire | 75 | No fire | 59 | No fire | 53 |
| Ex. 43 | $LiCo_{0.990}Mg_{0.01}O_2$ | Al and P coating | 0.024 | No fire | 76 | No fire | 61 | No fire | 56 |
| Ex. 44 | $LiCo_{0.990}Mg_{0.01}O_2$ | Al and P coating | 0.034 | No fire | 77 | No fire | 64 | No fire | 60 |
| Ex. 45 | $LiCo_{0.990}Mg_{0.01}O_2$ | Al and P coating | 0.49 | No fire | 78 | No fire | 67 | No fire | 62 |
| Ex. 46 | $LiCo_{0.990}Mg_{0.01}O_2$ | Al and P coating | 0.073 | No fire | 81 | No fire | 71 | No fire | 65 |
| Ex. 47 | $LiCo_{0.990}Mg_{0.01}O_2$ | Al and P coating | 0.098 | No fire | 83 | No fire | 75 | No fire | 70 |
| Ex. 48 | $LiCo_{0.990}Mg_{0.01}O_2$ | Al and P coating | 0.244 | No fire | 84 | No fire | 76 | No fire | 71 |

TABLE 5

| Core of positive electrode active material | Coating | P content of positive electrode active material relative to Co content (wt %) measured by ICP analysis | Penetration result at 4.2 V | 300th cycle-life at 25° C. during 4.2 V charging (%) | Penetration result at 4.35 V | 300th cycle-life at 25° C. during 4.35 V charging (%) | Penetration result at 4.5 V | 300th cycle-life at 25° C. during 4.5 V charging (%) |
| --- | --- | --- | --- | --- | --- | --- | --- | --- |
| Ex. 49 | $LiCo_{0.990}Mg_{0.01}O_2$ | Al and P coating | 0.488 | No fire | 85 | No fire | 77 | No fire | 71 |
| Ex. 50 | $LiCo_{0.990}Mg_{0.01}O_2$ | Al and P coating | 0.732 | No fire | 85 | No fire | 78 | No fire | 73 |
| Ex. 51 | $LiCo_{0.990}Mg_{0.01}O_2$ | Al and P coating | 0.977 | No fire | 85 | No fire | 79 | No fire | 75 |
| Ex. 52 | $LiCo_{0.990}Mg_{0.01}O_2$ | Al and P coating | 1.221 | No fire | 86 | No fire | 81 | No fire | 76 |
| Ex. 53 | $LiCo_{0.990}Mg_{0.01}O_2$ | Al and P coating | 1.465 | No fire | 87 | No fire | 82 | No fire | 78 |
| Ex. 54 | $LiCo_{0.990}Mg_{0.01}O_2$ | Al and P coating | 1.953 | No fire | 88 | No fire | 83 | No fire | 78 |
| Ex. 55 | $LiCo_{0.990}Mg_{0.01}O_2$ | Al and P coating | 2.441 | No fire | 91 | No fire | 84 | No fire | 79 |

TABLE 5-continued

| Core of positive electrode active material | Coating | P content of positive electrode active material relative to Co content (wt %) measured by ICP analysis | Penetration result at 4.2 V | 300th cycle-life at 25° C. during 4.2 V charging (%) | Penetration result at 4.35 V | 300th cycle-life at 25° C. during 4.35 V charging (%) | Penetration result at 4.5 V | 300th cycle-life at 25° C. during 4.5 V charging (%) |
|---|---|---|---|---|---|---|---|---|
| Ex. 56 | LiCo$_{0.990}$Mg$_{0.01}$O$_2$ | Al and P coating | 2.93 | No fire | 87 | No fire | 81 | No fire | 77 |
| Ex. 57 | LiCo$_{0.990}$Mg$_{0.01}$O$_2$ | Al and P coating | 3.418 | No fire | 85 | No fire | 80 | No fire | 74 |
| Ex. 58 | LiCo$_{0.990}$Mg$_{0.01}$O$_2$ | Al and P coating | 3.906 | No fire | 84 | No fire | 78 | No fire | 73 |
| Ex. 59 | LiCo$_{0.990}$Mg$_{0.01}$O$_2$ | Al and P coating | 4.395 | No fire | 83 | No fire | 77 | No fire | 71 |
| Ex. 60 | LiCo$_{0.990}$Mg$_{0.01}$O$_2$ | Al and P coating | 4.883 | No fire | 79 | No fire | 72 | No fire | 67 |

TABLE 6

| | Average capacity during the standard process of the battery cells according to Examples 1 to 60 (mAh) | Capacity during the standard process of the battery cells including LiCo$_{0.975}$Mg$_{0.025}$O$_2$ positive electrode active material |
|---|---|---|
| 4.2 V Cut-Off voltage | 2600 mAh | 2500 mAh |
| 4.35 V Cut-Off voltage | 2800 mAh | 2670 mAh |
| 4.5 V Cut-Off voltage | 3100 mAh | 2960 mAh |

Evaluation of Thermal Safety and Battery Cycle-Life Depending on Doping and Coating As shown in Table 1, a rechargeable lithium battery cell of Comparative Example 1 comprising a positive electrode active material with no doping or coating treatment was tested regarding penetration, and resultantly, it caught fire at 4.35 and 4.5 V. In addition, a rechargeable lithium battery cell of Comparative Examples 2, 3, and 4 including one with doping treatment were tested regarding penetration and caught fire at 4.35 and 4.5V. However, rechargeable lithium battery cells of Comparative Examples 5 to 11 did not catch fire at 4.35 and 4.5V as the amount of doping increased, but turned out to have sharply low cycle-life characteristics. This is because battery capacity decreases when the amount of doping is excessive. As shown in Table 6, when the doping amount was 2.5 mole %, the battery capacity sharply decreased.

As shown in Table 3, a rechargeable lithium battery of Comparative Examples 13 to 19 including only coating treatment caught fire at 4.35 and 4.5V, showing very low thermal safety. On the contrary, a rechargeable lithium battery of Comparative Examples 20 to 32 had increased thermal safety as the coating amount gradually increased, and thereby did not catch fire at 4.35 and 4.5V. However, it had a lower cycle-life characteristic than those of Comparative Examples 28 to 40 in Table 3, which were treated with the same amount of coating.

Furthermore, the rechargeable lithium batteries of Examples 2 to 10 and 12 to 60 in Table 1, 2, 4, and 5, which had both doping and coating treatments, did not catch fire at 4.2, 4.35, and 4.5V in a penetration test. Accordingly, the doping and coating treatments contribute to increasing thermal safety.

In addition, when batteries were evaluated regarding cycle-life characteristic at the 300th cycle and 25° C., those of Comparative Examples 1 to 11 and 13 to 15 had very low cycle-life characteristic at a high voltage of 4.35V and 4.5V. However, those of the examples uniformly had high cycle-life characteristics at a high voltage of 4.2V, 4.35V, and 4.5V.

Evaluation of Thermal Safety According to Doping Concentration

As shown in Tables 1 to 5, when a positive electrode active material included a uniform amount of P based on Co, the rechargeable lithium batteries of Examples 1 and 11 in which an element was doped at a concentration of less than 0.2% caught fire at a high voltage of 4.3V and 4.5V. They therefore did not have much improvement in thermal safety. However, when an element was doped at a concentration of more than 0.4% in Examples 2 to 10 and 12 to 60, thermal safety at a high voltage of 4.35V and 4.5V was significantly improved.

Evaluation of Thermal Safety and Cycle-Life Characteristic According to Coating Concentration As shown in Tables 3, 4, and 5, when an element was doped on the surface of LiCo$_{0.99}$Mg$_{0.01}$O$_2$ by changing the amount of P based on Co in the same LiCo$_{0.99}$Mg$_{0.01}$O$_2$, cycle-life characteristics were generally improved at a high temperature, the 300th cycle, and a high voltage of 4.2V, 4.35V, and 4.5V in proportion to the coating concentration. In particular, when P was present in an amount range of 0.997 to 3.418 wt % in Examples 31 to 37, cycle-life characteristics were significantly improved.

Therefore, the present invention can provide a positive electrode active material for a rechargeable lithium battery, a positive electrode for a rechargeable lithium battery, and a rechargeable lithium battery including these that has improved thermal safety and cycle-life characteristic by suppressing negative reaction between the positive electrode active material and an electrolyte at a high voltage.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A positive electrode for a rechargeable lithium battery comprising:
   a current collector; and
   a positive electrode active material layer disposed on the current collector,
   wherein the positive electrode active material layer comprises a positive electrode active material comprising a core comprising a compound of the following Formula 1, and a surface-treatment layer disposed on the core, $$Li_aCo_{1-b}M_bO_2 \qquad \text{Formula 1}$$

wherein the surface-treatment layer comprises $PO_4$, and further comprising one or more elements selected from the group consisting of Mg, and Al,
   wherein in Formula 1 $0.95 \leq a \leq 1.1$, $0.002 \leq b \leq 0.02$, and M is Mg.

2. The positive electrode of claim 1, wherein the element $PO_4$ of the surface-treatment layer is present in an amount of about 0.001 to about 6 wt % based on the weight of Co in the compound of Formula 1.

3. The positive electrode of claim 2, wherein the element $PO_4$ of the surface-treatment layer is present in an amount of about 0.005 to about 4.883 wt % based on the weight of Co in the compound of Formula 1.

4. The positive electrode of claim 1, wherein the surface-treatment layer comprises $PO_4$, and further comprises Mg.

5. A rechargeable lithium battery comprising the positive electrode of claim 1, with charge cut-off voltages of from about 4.2 to about 4.5V.

6. The rechargeable lithium battery of claim 5, further comprising:
   a negative electrode comprising a negative electrode active material; and a non-aqueous electrolyte comprising a non-aqueous organic solvent and a lithium salt.

7. The rechargeable lithium battery of claim 6, wherein the lithium salt comprises at least one selected from the group consisting of $LiPF_6$, $LiBF_4$, $LiSbF_6$, $LiAsF_6$, $LiClO_4$, $LiCF_3SO_3$, $LiC_4F_9SO_3$, $LiN(CF_3SO_2)_2$, $LiN(C_2F_5SO_2)_2$, $LiAlO_4$, $LiAlCl_4$, $LiN(C_pF_{2p+1}SO_2)(C_qF_{2q+1}SO_2)$, $LiSO_3CF_3$, LiCl, LiI, and $LiB(C_2O_4)_2$, wherein p and q are natural numbers.

8. The rechargeable lithium battery of claim 6, wherein the lithium salt has a concentration from about 0.1 to about 2.0M in the non-aqueous electrolyte.

9. The rechargeable lithium battery of claim 6, wherein the negative electrode active material comprises at least one material selected from the group consisting of lithium, a metal being capable of alloying with lithium, a material being capable of reversibly forming a lithium-containing compound by reaction with lithium ions, a material being reversibly capable of intercalating and deintercalating lithium ions.

10. The rechargeable lithium battery of claim 9, wherein the metal being capable of alloying with lithium comprises one or more selected from the group consisting of Na, K, Rb, Cs, Fr, Be, Mg, Ca, Sr, Ba, Ra, Al, and Sn.

11. The rechargeable lithium battery of claim 9, wherein the material being capable of reversibly forming a lithium-containing compound by reaction with lithium ions comprises one or more selected from the group consisting of tin oxide, silicon oxide, titanium nitrate, and silicon (Si).

12. The rechargeable lithium battery of claim 9, wherein the material being reversibly capable of intercalating and deintercalating lithium ions comprises a carbon-based material.

13. The rechargeable lithium battery of claim 12, wherein the carbon-based material comprises amorphous carbon or crystalline carbon.

14. The rechargeable lithium battery of claim 6, wherein the non-aqueous organic solvent comprises one or more selected from the group consisting of a carbonate-based solvent, an ester-based solvent, an ether-based solvent, a ketone-based solvent, an alcohol-based solvent, and an aprotic solvent.

15. The rechargeable lithium battery of claim 14, wherein the element $PO_4$ of the surface-treatment layer is present in an amount of about 0.005 to about 4.883 wt % based on the weight of Co in the compound of Formula 1.

16. The rechargeable lithium battery of claim 5, wherein the element $PO_4$ of the surface-treatment layer is present in an amount of about 0.001 to about 6 wt % based on the weight of Co in the compound of Formula 1.

17. The rechargeable lithium battery of claim 5, wherein the surface-treatment layer comprises $PO_4$, and further comprises Mg.

18. A rechargeable battery comprising a positive electrode with charge cut-off voltages of from about 4.2 to about 4.5V, which comprises a positive electrode active material comprising $Li_aCo_{1-b}M_bO_2$ and a surface-treatment material,
   wherein $0.95 \leq a \leq 1.1$, $0.002 \leq b \leq 0.02$, and M consists of one element selected from the group consisting of Mg,
   wherein the surface-treatment material comprises $PO_4$ and further comprises one or more elements selected from the group consisting of Mg and Al.

19. The battery of claim 18, wherein the positive electrode active material comprises grains comprising $Li_aCo_{1-b}M_bO_2$.

20. The battery of claim 19, wherein at least part of the grains have diameter from about 10 μm to about 20 μm.

21. The battery of claim 19, wherein the surface-treatment material is coated on at least one grain.

22. The battery of claim 19, wherein the surface-treatment material substantially surrounds at least one of the grains.

* * * * *